United States Patent [19]
Yamaguchi et al.

[11] 3,967,006
[45] June 29, 1976

[54] DRY PROCESS FOR THE PRODUCTION OF PLASTIC-COATED INORGANIC SUBSTANCES

[75] Inventors: Tadashi Yamaguchi; Takayuki Ono, both of Sendai; Hiroshi Hoshi, Narashino; Michio Hirakawa; Isao Watanabe, both of Ichikawa, all of Japan

[73] Assignee: Lion Yushi Kabushiki Kaisha (Lion Fat & Oil Co., Ltd.), Tokyo, Japan

[22] Filed: Feb. 1, 1974

[21] Appl. No.: 438,534

[30] Foreign Application Priority Data
Feb. 3, 1973 Japan............................ 48-13918

[52] U.S. Cl................................. 427/221; 427/341
[51] Int. Cl.² ........................................ B05D 7/00
[58] Field of Search ......... 117/100 B, 100 S, 106 R; 260/42.53; 427/221, 341

[56] References Cited
UNITED STATES PATENTS

| | | | |
|---|---|---|---|
| 2,876,133 | 3/1959 | Sler et al. .................. | 117/106 R |
| 3,157,527 | 11/1964 | Fournet et al. ............. | 117/106 R |
| 3,219,476 | 11/1965 | Robbins .................... | 117/106 R |
| 3,448,073 | 6/1969 | McManimie ................ | 260/42.53 |
| 3,468,828 | 9/1969 | Perrins et al. .............. | 260/42.53 |
| 3,475,307 | 10/1969 | Knox et al. ................. | 117/106 R |
| 3,519,593 | 7/1970 | Bolger ...................... | 260/42.53 |
| 3,607,365 | 9/1971 | Lindlof ..................... | 117/106 R |
| 3,635,879 | 1/1972 | Baer et al. ................. | 260/42.53 |
| 3,661,620 | 5/1972 | Dekking et al. ............ | 117/100 B |

*Primary Examiner*—Harry J. Gwinnell
*Assistant Examiner*—Dennis C. Konopacki
*Attorney, Agent, or Firm*—William J. Daniel

[57] ABSTRACT

Dry process for the production of inorganic granular substances coated with plastics, characterized in that a radical-polymerizable vinylic monomer carried on the surface of an inorganic granular substance is brought in a gaseous phase into contact with gaseous sulfur dioxide to effect polymerization of the monomer. The resulting plastic-coated inorganic substances are useful in various fields of industry, for example, as fillers, construction materials, molding materials, electrode materials, delayed-action fertilizers, etc.

6 Claims, No Drawings

3,967,006

DRY PROCESS FOR THE PRODUCTION OF PLASTIC-COATED INORGANIC SUBSTANCES

BACKGROUND OF THE INVENTION

This invention relates to an improvement in the process for the production of plastic-coated inorganic substances. More particularly, this invention relates to a process for the production of plastic-coated inorganic granular substances which comprises polymerizing in a gaseous phase a monomer carried on an inorganic granular substance.

Hitherto, plastic-coated substances have been produced by mixing a monomer, a catalyst and a core substance each in an aerosol form or by introducing a monomer into a suspension of particles of a core substance in a gaseous phase and polymerizing the monomer in the presence of a catalyst. In these prior art processes, however, polymerization of a monomer does not necessarily take place on the surface of the core particles and dispersion or local agglomeration of the resulting polymer takes place in the gaseous phase. Accordingly, these prior art processes suffer from the serious drawback that even or uniform coatings of the polymer on the core particles are attained only with extreme difficulty.

To overcome such serious drawbacks in prior art processes, the present inventors already proposed a wet process for producing inorganic substances coated with plastics wherein an inorganic granular material is suspended in a liquid containing a vinylic monomer and bisulfite ions and polymerization of the monomer is allowed to take place on the surface of the inorganic granules without the necessity of using any polymerization initiator. According to this process, the drawbacks in prior art processes are remarkably overcome and inorganic granular substances evenly coated with a plastic polymer can be obtained in a comparatively simple manner. As this wet process is carried out in an aqueous medium, however, additional after-treatments such as washing and drying are required for recovering the resulting product. Moreover, this wet process has the disadvantage that it cannot be applied to those inorganic substances which are dimensionally unstable or soluble in water. Thus, there is a need for modifying this wet process so that it may be applied to inorganic substances without using any liquid medium.

BRIEF SUMMARY OF THE INVENTION

Accordingly, it is an object of this invention to provide a dry process for the production of plastic-coated inorganic substances.

It is another object of this invention to provide a process for producing inorganic granular substances evenly coated with a plastic polymer in a relatively simple and easy manner without using any liquid medium.

It is still another object of this invention to provide inorganic granular substances evenly coated with a plastic polymer.

Other objects, features and advantages of this invention will become apparent as the description proceeds.

DETAILED DESCRIPTION OF THE INVENTION

As the result of continuing research for improving the previously proposed process, it has now been found in accordance with this invention that inorganic substances evenly coated with plastics are obtained when an inorganic granular substance having a vinylic monomer carried thereon is brought in a gaseous phase into contact with gaseous sulfur dioxide to effect polymerization of the monomer.

According to the present process, polymerization of the vinylic monomer takes place preferentially on the surface of the inorganic core particles. As the polymerization rarely takes place elsewhere, inorganic granular substances evenly coated with a plastic polymer can thus be easily obtained.

Illustrative of inorganic granular substances useful in this invention as core particles are carbonaceous substances and inorganic substances containing a transition metal. Typical examples of these substances include simple metals, such as iron powder, copper powder and silver powder; oxides, such as ferrite, red oxide, and cupric oxide; salts, such as nickel sulate, cupric carbonate and zinc chloride; and inorganic substances containing a small amount of a transition metal or metals in their composition, such as sand, ore powder, red mud, granular slug and asbestos powder. Besides these, gypsum, calcium carbonate, alumina, glass, etc., can also be used but these relatively inactive inorganic substances are advantageously used after mixture or superficial treatment with a substance containing one or more transition metals. These inorganic substances are used in the form of powders having a granularity sufficiently small to be suspended in a gaseous phase, i.e., a particle diameter of less than 5 mm, preferably 1–100$\mu$. If desired, these inorganic substances may be subjected in advance to a preliminary treatment with a polymer such as polyvinyl alcohol or polyacrylonitrile or with a surfactant such as calcium stearate.

Preferred vinylic monomers to be carried on the surface of the inorganic granular substances are radical-polymerizable or radical-copolymerizable monomers including $\alpha,\beta$-ethylenically unsaturated acids, such as acrylic acid and methacrylic acid and salts and esters thereof; vinyl esters of fatty acids, such as vinyl acetate, vinyl propionate and vinyl butyrate; halogenated olefins, such as vinyl chloride and vinylidene chloride; styrenes, such as styrene itself and $\alpha$-methylstyrene; dienes, such as butadiene, isoprene and chloroprene; unsaturated nitriles, such as acrylonitrile and methacrylonitrile; and crosslinkable monomers, such as N-methylolacrylamide and divinylbenzene. These monomers are usually applied in the form of a solution in water or an organic solvent onto the surface of inorganic substances, but gaseous or liquid monomers may be adsorbed directly onto the surface of the granules of the inorganic substance. The monomer is used in an amount sufficient to afford 5–100 parts by volume of a polymer per 100 parts by volume of the inorganic substance. The treatment for applying the monomer to the inorganic substance is carried out, for example, by mixing both homogeneously or spraying the monomer on the inorganic substance or by dipping the inorganic substance into the monomer and then removing.

The thus obtained inorganic substance carrying the monomer thereon is charged into a reaction vessel while suspended in a gaseous phase by shaking or blowing with a gas and brought into contact with gaseous sulfur dioxide. In this case, gaseous sulfur dioxide is used in an amount of 0.01–100 parts by weight, preferably 2–10 parts by weight per 100 parts by weight of the monomer.

In this invention, it is necessary to conduct the polymerization reaction in the presence of a small amount of water or a lower alcohol. Accordingly, it is preferable to incorporate a small amount of water or a lower alcohol into the monomer to be applied to the granules of the inorganic substance or to introduce a vapor of water or a lower alcohol into the reaction system.

According to this invention, inorganic substances evenly coated with plastics can be obtained in a simple manner without using any solvent or radical polymerization initiator. The resulting plastic-coated inorganic substances find utility in various fields, for example, as fillers for plastics, construction materials, molding materials, magnet materials, electrode materials and delayed-action fertilizers.

This invention will now be explained in more detail by way of the following examples.

EXAMPLE 1

Barium ferrite, red oxide, nickel sulfate, copper powder, Toyoura standard sand, artificial graphite, carbon black and Zircon sand each were finely divided to have a particle size of about 200 mesh. Using these inorganic substances as starting materials, inorganic granular substances effectively coated with a plastic high molecular substance were produced according to the following process.

In 50 ml pressure-resistant glass reaction tubes were placed 20.0 g of each of the above inorganic substances, together with 0.02 of water and 2.5 g of a given vinylic monomer. The mixture was vigorously shaken for 5 minutes. To this mixture was added 0.05 g of liquid sulfur dioxide and then the glass reaction tube was sealed. In a constant temperature box kept at 60°C, the sealed tube was vigorously shaken for 4 hours by means of a vibrator. The pressure in the sealed tube was reduced to remove unreacted monomer, water and sulfur dioxide. Observation of the resultant solid matter with an electron microscope showed that the surface of the inorganic granular substance was wholly coated with a high molecular substance. Where 0.05 g of benzoyl peroxide (dissolved in the monomer) was used in place of sulfur dioxide, local agglomeration of a high molecular substance took place and a part of the inorganic substance was not coated with the high molecular substance. The results of this series of experiments are shown in Table 1.

TABLE 1

| Exp. No. | Inorganic Substance | Monomer | Total Wt of Prod. (g) | Content of Polymer (wt %) | Eval. of Coating |
|---|---|---|---|---|---|
| 1 | BaO.6Fe$_2$O$_3$ | MMA | 22.2 | 9.9 | Very Good |
| 2 | Fe$_2$O$_3$ (red oxide) | MA | 22.3 | 10.3 | Very Good |
| 3 | NiSO$_4$ | MMA | 22.3 | 10.3 | Very Good |
| 4 | Copper Powder | MMA:MA (1:1) | 22.4 | 10.7 | Very Good |
| 5 | Toyoura Standard Sand | MMA:St (8:2) | 22.1 | 9.5 | Very Good |
| 6 | Graphite | MMA | 22.3 | 10.3 | Very Good |
| 7 | Carbon black (for coloring) | MMA | 21.8 | 8.3 | Very Good |
| 8 | Zircon sand | AN:St (1:1) | 21.2 | 5.7 | Good |
| 9[1] | NiSO$_4$ | MMA | 21.6 | 7.4 | Local agglom. of polymer |
| 10[1] | Fe$_2$O$_3$ (red oxide) | MA | 21.7 | 7.8 | '' |

[1]Designates comparative examples using benzoyl peroxide
[2]MMA = Methyl methacrylate; MA = Methyl acrylate; St = Styrene; AN = Acrylonitrile

EXAMPLE 2

The surface of particles of barium ferrite BaO.6Fe$_2$O$_3$ (20.0 g) having a particles size of 100–200 mesh was treated with polyvinyl alcohol to prepare barium ferrite particles having a polyvinyl alcohol content of 0.5%. The treated particles were placed in a 50 ml 3-necked flask and vigorously shaken for 0.5 hour together with 2.0 g of methyl methacrylate. While continuously shaking the mixture at 50°C, about 0.1 g of gaseous sulfur dioxide was added thereto at 50°C to effect polymerization of the monomer. The mixture was shaken for 4 hours at 50°C and then dried under reduced pressure to obtain 21.7 g of a solid substance which had a polymer content of 7.8%. Microscopic observation of the solid substance showed that the surface of the barium ferrite was evenly coated with a plastic polymer. This product was compression molded at 200°C under a pressure of 250 kg/cm$^2$ to give a strong ferrite molded article.

EXAMPLE 3

Using ammonium sulfate finely divided to have a particle size of 100–200 mesh and red oxide (Fe$_2$O$_3$) having a particle size of about 300 mesh as starting materials, a composite substance coated with a polymer was prepared in the following way.

In a 50 ml pressure-resistant reaction tube were placed 20.0 g of ammonium sulfate and then 0.2 g of red oxide. The mixture was homogeneously mixed by vigorous shaking. 4.0 Grams of methyl methacrylate were then added to the mixture and the whole was shaken for 30 minutes to allow the monomer to deposit on the inorganic particles. 0.2 Gram of sulfur dioxide was blown together with a small amount of steam into the reaction tube and the mixture was continuously shaken at 50°C for 6 hours. The reaction mixture was dried under reduced pressure to obtain 23.5 g of a solid substance. Microscopic observation of the solid substance showed that the ammonium sulfate particles were evenly coated with a plastic polymer.

In a similar manner but using 20.0 g of gypsum in place of ammonium sulfate, a composite inorganic substance having a total weight of 23.7 g and composed of gypsum evenly coated with a plastic polymer was obtained.

What is claimed is:

1. A substantially dry process for producing vinyl polymer coated inorganic particles which comprises applying to core particles of an inorganic granular material a surface coating of a vinyl monomer and suspending said monomer-coated particles in an atmosphere containing gaseous sulfur dioxide in the presence of a small amount of water or lower alcohol sufficient to initiate polymerization of said monomer coating on said core particles in the absence of a radical polymerizing agent for said monomer.

2. A process according to claim 1 wherein the inorganic granules have a granule size of less than 5 mm.

3. A process according to claim 1 wherein the radical-polymerizable vinylic monomer is used in an amount sufficient to give 5–100 parts by volume per 100 parts by volume of the inorganic granular substance.

4. A process according to claim 1 wherein sulfur dioxide is used in an amount of 0.01–100 parts by weight per 100 parts by weight of the monomer.

5. A process according to claim 1 wherein the monomer is methyl methacrylate.

6. The process of claim 1 wherein said granular material has a particle size of about 1–100μ.

* * * * *